United States Patent [19]

Haitko

[11] Patent Number: 4,482,697

[45] Date of Patent: Nov. 13, 1984

[54] PROCESS, COMPLEX AND CATALYST FOR PREPARATION OF POLYPHENYLENE OXIDE

[75] Inventor: Deborah A. Haitko, Schenectady, N.Y.

[73] Assignee: General Electric Company, Schenectady, N.Y.

[21] Appl. No.: 494,835

[22] Filed: May 16, 1983

Related U.S. Application Data

[63] Continuation-in-part of Ser. No. 474,604, Mar. 11, 1983.

[51] Int. Cl.$^3$ ............................................. C08G 65/44
[52] U.S. Cl. ................................. 528/215; 528/212; 528/216
[58] Field of Search .................... 528/212, 215, 216; 502/165

[56] References Cited

U.S. PATENT DOCUMENTS

| | | | |
|---|---|---|---|
| 3,306,874 | 2/1967 | Hay | 528/212 |
| 3,306,875 | 2/1967 | Hay | 528/212 |
| 3,661,848 | 5/1972 | Cooper et al. | 528/212 |
| 3,733,299 | 5/1973 | Cooper et al. | 528/215 |
| 3,914,266 | 10/1975 | Hay | 528/212 |
| 4,028,341 | 6/1977 | Hay | 528/212 |

*Primary Examiner*—Lester L. Lee
*Attorney, Agent, or Firm*—William H. Pittman; James C. Davis, Jr.; James Magee, Jr.

[57] ABSTRACT

Polyphenylene oxides are prepared by the oxidative coupling of monohydroxy aromatic compounds such as 2,6-xylenol in the presence of copper-halide-amine catalysts in which at least part of the amine component is an aromatic diamine such as N,N'-diphenylethylenediamine, N,N'-diphenyl-N,N'-dimethylethylenediamine, N,N'-diphenylpiperazine or N,N,N',N'-tetramethyl-o-phenylenediamine. Other amines preferably present in the catalyst are a tertiary monoamine such as dimethyl-n-butylamine and a secondary monoamine such as di-n-butylamine. These diamines are characterized by a low rate of consumption during polymerization, and the catalysts prepared therefrom are hydrolytically stable.

21 Claims, No Drawings

PROCESS, COMPLEX AND CATALYST FOR PREPARATION OF POLYPHENYLENE OXIDE

This application is a continuation-in-part of copending application Ser. No. 474,604, filed Mar. 11, 1983.

This invention relates to the preparation of polyphenylene oxides by the oxidative coupling of monohydroxy aromatic compounds, to catalysts useful in such preparation, and to complexes used in the formulation of the catalysts. In its broadest sense, the invention in one of its aspect is directed to oxidative coupling catalysts comprising compositions prepared by blending a source of copper ions, a source of halide ions and an amine component, at least part of said amine component being at least one diamine having the formula

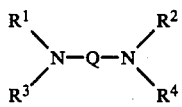

wherein Q is a lower hydrocarbon bridging radical in which the free valence bonds are attached to adjacent carbon atoms, each of $R^1$ and $R^2$ is a hydrocarbon or substituted hydrocarbon radical containing about 1–10 carbon atoms, and each of $R^3$ and $R^4$ is hydrogen or a saturated lower aliphatic radical, or $R^3$ and $R^4$ together form a divalent saturated aliphatic radical containing 2–4 carbon atoms; one of said radicals attached to each nitrogen atom being aromatic and the balance thereof being hydrogen, aliphatic or alicyclic.

The preparation of polyphenylene oxides by the oxidative coupling of monohydroxy aromatic compounds is well known in the art. Among the patents disclosing polyphenylene oxides and methods for their preparation are the following, the disclosures of all of which are incorporated by reference herein:

U.S. Pat. No. 3,306,874 (hereinafter '874)
U.S. Pat. No. 3,306,875 (hereinafter '875)
U.S. Pat. No. 3,384,619
U.S. Pat. No. 3,432,466
U.S. Pat. No. 3,639,656
U.S. Pat. No. 3,642,699
U.S. Pat. No. 3,661,848
U.S. Pat. No. 3,733,299
U.S. Pat. No. 3,914,266 (hereinafter '266)
U.S. Pat. No. 4,028,341 (hereinafter '341).

At present, the preferred catalysts for the preparation of polyphenylene oxides from monohydroxy aromatic compounds are copper-halide-amine catalysts. These are typically made by blending (often in solution in the monohydroxyaromatic compound) a source of copper ions, a source of halide (preferably bromide) ions and an amine component. The amine component comprises at least one amine and usually a plurality of amines of different chemical structures. Especially preferred are mixtures of at least one tertiary monoamine, at least one secondary monoamine and at least one diamine.

As disclosed in the '341 patent, the diamines which are preferred for use in the catalyst are those having a $C_{2-4}$ alkylene or $C_{3-7}$ cycloalkylene and preferably an ethylene group connecting the two nitrogens, and having a bulky alkyl group additionally attached to each nitrogen. The preferred diamine disclosed therein is N,N'-di-t-butylethylenediamine. It has now been found, however, that this diamine is often consumed quite rapidly in the polymerization and must frequently be replenished in order to complete the polymerization. Therefore, it is of interest to develop catalyst compositions in which the amines are not so rapidly consumed. It is also of interest to expand the choice of amines suitable for use in such catalysts.

A principal object of the present invention, therefore, is to provide improved catalyst systems for the production of polyphenylene oxides.

A further object is to provide a wider selection of amines useful in such catalyst systems.

A further object is to provide a process for producing polyphenylene oxides using an improved catalyst, the improvements therein being attributable to the identity of the diamine constituent.

A still further object is to provide a catalyst system and polymerization method which are characterized by decreased consumption of the diamine constituent during polymerization.

Other objects will in part be obvious and will in part appear hereinafter.

Typical monohydroxy aromatic compounds (hereinafter sometimes referred to as "phenols" for brevity) useful for the preparation of polyphenylene oxides according to this invention are those having the formula

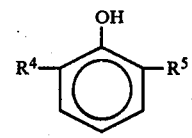

wherein $R^4$ is a lower primary alkyl group and $R^5$ is a lower primary or secondary alkyl group, the word "lower" meaning that it contains up to 7 carbon atoms. Examples of lower primary alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of lower secondary alkyl groups are isopropyl, sec-butyl and 1-ethylpropyl. Preferably, $R^4$ and $R^5$ are straight chain rather than branched. Since the polyphenylene oxides in which $R^4$ and $R^5$ are other than methyl generally have no more desirable properties than those in which they are both methyl, and since 2,6-xylenol is the most readily available and cheapest 2,6-dialkylphenol, its use is preferred. The polyphenylene oxide obtained is then poly(2,6-dimethyl-1,-4-phenylene oxide). Other suitable phenols are disclosed in the '874, '875 and '341 patents.

Various copper-halide-amine catalysts containing monoamines have been disclosed for the preparation of polyphenylene oxides, and any of such catalysts and/or monoamines can be used in accordance with this invention. The source of copper ion therein can be any of the cupric or cuprous compounds disclosed in the '341 patent; particular reference is made to column 8, line 61, to column 9, line 53. For example, it can be an inorganic bromide (except for ammonium bromide, because the ammonium ion can also form a strong complex with copper ions) and can include bromine and hydrogen bromide. Also useful are organic bromine compounds which, under reaction conditions, produce bromide ions. An example thereof is 4-bromo-2,6-xylenol. The only basic requirement is that the bromine compound be capable of supplying a form of bromide ion which is soluble in the reaction mixture. If the bromine compound itself is insoluble, it can still be satisfactory if it forms soluble complexes with the amine component or produces a soluble product under oxidative coupling conditions. When metal bromides other than the copper bromides are used, the particular metal used is merely one of choice. Since some of these materials (e.g., cobalt) form complexes with amines, suitable adjustments in the amount of amine used may sometimes be necessary. Because of low cost and ready availability, when using a metal bromide often the alkali or alkaline earth metal bromides are used, e.g., sodium bromide. Since hydrogen bromide will react with amines to form an amine hydrobromide salt and bromide will brominate the phenol and simultaneously produce hydrogen bromide, again adjustments in the amount of amine may be necessary in such situations.

The currently preferred bromine source is HBr, which may conveniently be combined with the copper source as a solution of cuprous oxide in aqueous hydrobromic acid.

The monoamine constituents of the catalyst mixture may be any of those disclosed in the '874, '875, '266 and '341 patents. Preferably, however, they include at least one tertiary monoamine, which can be selected from those disclosed in the '875 and '341 patents; specific reference should be made to columns 3–5 of '875 and column 8, lines 12–33, of 341. The tertiary monoamine can be heterocyclic or a trialkylamine characterized by having the amine nitrogen attached to at least two groups which have a small cross-sectional area. In the case of a trialkylamine, it is preferred that at least two of the alkyl groups are methyl with the third being a $C_{1-8}$ primary or $C_{3-8}$ secondary alkyl, and it is more preferred that the third substituent have no more than four carbon atoms. Illustrative tertiary monoamines are N-methylpyrrolidine and dimethyl-n-butylamine, with the latter being preferred.

At least one secondary monoamine as disclosed in the '874 patent from column 4, line 62, to column 6, line 13, may optionally be used in the catalyst. The presence of such a secondary monoamine appears to have the effects of increasing impact strength of the product polymer and increasing catalyst activity. Illustrative secondary monoamines are dimethylamine, diethylamine, dipropylamine, dibutylamine, diisopropylamine, dibenzylamine, dicyclohexylamine, diethanolamine, ethylmethylamine, methylpropylamine, allylethylamine, methylcyclohexylamine, morpholine, methyl-n-butylamine, ethylisopropylamine, benzylmethylamine, octylbenzylamine, octylchlorobenzylamine, methylcyclohexylamine, methylphenethylamine, benzylethylamine, di(chlorophenethyl)-amine, 1-methylamino-2-phenylpropane and 1-methylamino-4-pentene. Aliphatic amines, especially those in which the aliphatic groups are straight chain hydrocarbon groups, are preferred. The most preferred amine of this type is di-n-butylamine.

The principal novel feature of the present invention is the identity of the diamine constituent of the catalyst. In the formula for said diamine, each of $R^1$ and $R^2$ is a hydrocarbon or substituted hydrocarbon radical containing about 1–10 carbon atoms. These radicals may be aliphatic, alicyclic or aromatic. The following types of radicals are preferred for $R^1$ and $R^2$:

Saturated lower aliphatic radicals. These radicals may be alkyl (i.e., hydrocarbon) radicals, which are preferred, or substituted alkyl radicals in which the substituents do not materially alter the hydrocarbon character of the radical for the purposes of this invention. Illustrative substituents are hydroxy, alkoxy, fluoro, alkylthio, ketone and carboxylic acid ester radicals. In general, not more than about two such substituents will be present on each radical. Illustrative alkyl radicals are methyl, ethyl, n-propyl, isopropyl, n-butyl, isobutyl, n-hexyl and n-heptyl.

Saturated alicyclic radicals containing about 5–10 carbon atoms. These may be cycloalkyl radicals (preferably) or may contain substituents of the type and in the proportions described hereinabove. Illustrative cycloalkyl radicals are cyclopentyl, cyclohexyl, methylcyclopentyl and methylcyclohexyl.

Aromatic radicals containing about 6–10 carbon atoms. These may be hydrocarbon radicals or may contain substituents, typically electron-donating substituents such as alkyl, hydroxy, alkoxy or alkylthio. In general, not more than about three such substituents will be present on any aromatic radical. Illustrative aromatic radicals are phenyl, naphthyl, tolyl, xylyl, hydroxyphenyl, methoxyphenyl, hydroxynaphthyl and methylthionaphthyl.

Most often, $R^1$ and $R^2$ are identical and are either alkyl or aromatic hydrocarbon radicals. The particularly preferred radicals of these types are methyl and phenyl, respectively.

Each of $R^3$ and $R^4$ may be hydrogen or a saturated lower aliphatic radical. These radicals may also be hydrocarbon radicals (preferably) or substituted radicals in which the substituents are of the type and in the proportions described hereinabove with respect to $R^1$ and $R^2$.

Alternatively, the $R^3$ and $R^4$ radicals may together form a divalent saturated aliphatic radical containing 2–4 carbon atoms. Thus, $R^3$ and $R^4$ together may be unsubstituted (preferably) or substituted ethylene, propylene, trimethylene, tetramethylene or the like. In such compounds, the central portion of the diamine molecule is a heterocyclic moiety in which the two nitrogen atoms are hetero atoms. The preferred compounds are those in which $R^3$ and $R^4$ are each hydrogen (which is especially preferred) or methyl, or in which they together form an ethylene radical.

The Q moiety is a lower hydrocarbon bridging radical in which the free valence bonds (i.e., those bonded to nitrogen in the formula) are attached to adjacent carbon atoms. The bridging radical may be 1,2-alkylene such as ethylene, propylene, 1,2-butylene or 2,3-butylene; 1,2-cycloalkylene such as 1,2-cyclopentylene or 1,2-cyclohexylene; or a similar aromatic radical such as o-phenylene or 2,3-naphthylene. Most often, Q is an aliphatic radical containing 2–4 carbon atoms (preferably ethylene) or o-phenylene.

In all of the suitable diamines, one radical attached to each nitrogen atom is aromatic and the balance thereof are hydrogen, aliphatic or alicyclic. Thus, either Q is aromatic and both $R^1$ and $R^2$ are aliphatic or alicyclic, or $R^1$ and $R^2$ are aromatic and Q is aliphatic or alicyclic.

As will be apparent from the foregoing, a wide variety of secondary, tertiary and mixed secondary-tertiary diamines may be used according to this invention. The preferred diamines are N,N'-diphenylethylenediamine, N,N'-diphenyl-N,N'-dimethylethylenediamine, N,N'-diphenylpiperazine and N,N,N',N'-tetramethyl-o-phenylenediamine.

The exact method of preparing the copper-halide-amine catalyst is not critical. However, it is frequently convenient to provide the copper and at least a portion of the halide and diamine in the form of a divalent copper complex. Novel complexes of this type are an aspect of the present invention. They may be represented by the formula

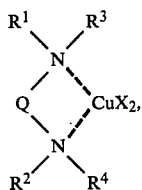

wherein, Q, $R^1$, $R^2$, $R^3$ and $R^4$ are as previously defined and X is halide (i.e., chloride, bromide or iodide), preferably bromide. Such complexes may be prepared by reacting a cupric halide of the formula $CuX_2$ with the diamine in a mole ratio of approximately 1:1. The reaction takes place upon contact, typically at temperatures within the range of about 20°–40° C. It is frequently advantageous to dissolve the cupric halide and the diamine in a substantially inert diluent such as an alkanol, whereupon the complex may precipitate from the diluent as it is formed.

The preparation of copper-halide-amine complexes of this invention is illustrated by the following examples.

EXAMPLE 1

A solution in 25 ml. of absolute ethanol of 0.736 gram (4.48 millimoles) of freshly distilled N,N,N',N'-tetramethyl-o-phenylenediamine was added dropwise to a solution in 25 ml. of absolute ethanol of 1 gram (4.48 millimoles) of cupric bromide. The black crystals which precipitated were collected and dried under vacuum to yield the desired complex. It contained 30.4% carbon (calc. 30.9%), 4.1% hydrogen (calc. 4.3%), 7.1% nitrogen (calc. 7.2%) and 44.1% bromine (calc. 41.2%).

EXAMPLE 2

Following the procedure of Example 1, a complex of cupric bromide and N,N'-diphenylethylenediamine was prepared from 1 gram (4.48 millimoles) of cupric bromide and 0.94 gram (4.48 millimoles) of the diamine. It contained 37.0% carbon (calc. 38.6%), 3.5% hydrogen (calc. 3.7%), 6.8% nitrogen (calc. 6.4%) and 39.1% bromine (calc. 36.7%).

The copper-halide-amine catalyst of this invention is often used in the form of a solution in the phenol, and when so used it may be preferred to add the phenol to the preformed catalyst rather than the reverse. Various optional procedures are described in the '875 patent at col. 17, lines 9–19; these procedures may be varied by those skilled in the art as necessary to accomodate the use of the complexes of this invention.

A phase transfer agent may also optionally be used in the oxidative coupling reaction system as a reaction rate promoter. Useful phase transfer agents are disclosed in U.S. Pat. No. 3,988,297, hereby incorporated by reference; specific reference is made to column 2, lines 11–26, and column 3, lines 1–23. The currently preferred phase transfer agent is Adogen 464, which is a methyltrialkylammonium chloride wherein the alkyl groups have from 8 to 10 carbon atoms.

One or more solvents may be present in the reaction mixture. Typical solvents are disclosed in the '874, '875 and '341 patents. The function of the solvent is to provide a liquid phase in which both the phenol and catalyst are soluble. It need not act as a solvent for the reaction products. Illustrative solvents are toluene and benzene; other inexpensive and readily available commercial solvents may also be used.

According to this invention, the oxidative coupling reaction is conducted merely by passing oxygen into the mixture of phenol, catalyst and solvent (if used) at a temperature up to about 40° C. and typically at a rate of about 0.8–1.2 SCFH, until no more heat is generated or the desired amount of oxygen is absorbed. The amount of oxygen generally used is about 0.5–1 mole per mole of phenol. If desired, the oxygen can be diluted with inert gases or air can be used, but the use of pure oxygen is preferred. Sub- or superatmospheric pressures can be used but are seldom if ever necessary.

The invention may be used in both batch and continuous processes. When a batch process is sued, the time required is normally about 2–4 hours.

The ratios of reactants and catalyst ingredients used in the oxidative coupling process are somewhat important, but no single ratio is considered critical. The phenol is generally used in an amount of about 5–60%, preferably 10–40% and most preferably 15–25%, of total solution weight. Products which have a commercially desirable molecular weight are most easily obtained in the area of 20% phenol.

The activity of the catalysts of this invention is such that they can be used in relatively low concentration. Copper ratios, for example, are generally 1 mole of copper to about 100–1500 and preferably 250–1000 moles of phenol. The molar ratio of halide to copper ions in the catalyst affects catalyst activity and should be at least about 2:1; a ratio of at least about 3.5:1 is preferred. The upper limit of the ratio of halide to copper is not critical and molar ratios as high as 6–12:1 or more can be used. The currently preferred molar ratio is 4–6:1.

The molar ratio of diamine to copper is generally about 0.4–3:1, and the molar ratio of tertiary monoamine to copper about 10–100:1 and preferably 20–60:1. The secondary monoamine, when present, is generally used in the amount of about 0.5–3 mole percent based on phenol, with 0.5–2 mole percent being preferred. The phase transfer agent, when present, is typically used in the amount of about 0.1–0.8%, preferably 0.1–0.2%, by weight based on phenol.

It will be apparent to those skilled in the art that the amounts of halide and diamine in the catalyst system may be greater than those provided by the complexes of this invention. In that event, halide and/or diamine may be added separately.

The polyphenylene oxides produced in accordance with this invention typically have a weight average molecular weight of about 5,000–75,000, corresponding to an intrinsic viscosity of about 0.01–0.75 dl./g. as determined in chloroform at 25° C. The molecular weight is preferably above about 50,000. The product polymer may be isolated from solution by conventional methods such as precipitation by addition of a non-solvent for the polymer.

The effectiveness of the above-described diamines as catalyst constituents for polyphenylene oxide formation was unexpected because of previously held theories about the structure of the catalyst and its mode of operation. In the first place, it was believed that cuprous and cupric ion complexes of the classical type were involved, and that the reaction involved interconversion between the cuprous and cupric complexes. Both cuprous and cupric ion have normal coordination numbers of 4, but the configuration of the cuprous complexes is tetrahedral while that of the cupric complexes is square planar. It was assumed, therefore, that one of the requirements of diamines used for complex formation was flexibility in the molecular structure connecting the two nitrogen atoms. Such flexibility does not exist in the o-phenylene diamines used according to this invention. Since the aromatic bridge connecting the nitrogen atoms is very rigid, these diamines would not have been expected to produce an active catalyst species.

In the second place, it was believed that the mechanism of the oxidative coupling reaction involved a dehydrogenation of the copper-amine complex which was facilitated by the presence of electron-rich substituents such as the t-butyl group on the nitrogen atoms. No such substituents are present on the diamines used according to this invention. Several of them contain moderately electron-rich methyl groups, but all additionally contain electron-deficient aromatic groups attached to both nitrogen atoms. It would not have been expected that compounds containing electron-deficient moieties could be used to produce active catalyst species.

The catalysts of this invention are hydrolytically stable, so that it is unnecessary to remove water formed in the oxidative coupling reaction. An additional advantage of at least the diamines in which Q is aliphatic is that they are characterized by a low rate of consumption during polymerization, as compared with diamines previously used.

The process of this invention is illustrated by the following examples. All intrinsic viscosities were determined in chloroform at 25° C., and all molecular weights are weight average molecular weights which were determined by gel permeation chromatography.

EXAMPLE 3

A mixture of 40 grams of 2,6-xylenol, 1.96 ml. of dimethyl-n-butylamine, 0.52 ml. of di-n-butylamine, 0.02 gram of Adogen 464 and 0.1546 gram of N,N'-diphenylethylenediamine was diluted with toluene to 200 ml. and transferred to a tube equipped with a vibromixer, an oxygen inlet and a thermometer. Oxygen was passed through the mixture for 1 minute, and then 0.224 ml. of a solution of 2.36 grams of cuprous oxide in 20 ml. of 48% aqueous hydrogen was added. Oxygen passage was continued at 0.84 mole per hour for 2¼ hours at 40° C. The polyphenylene oxide polymer was isolated by precipitation with methanol. It had an intrinsic viscosity of 0.43 g./dl. and a molecular weight of 52,800.

EXAMPLE 4

The procedure of Example 3 was repeated, substituting N,N'-diphenylpiperazine on an equimolar basis for the N-N'-diphenylethylenediamine. The polymerization time was about 2½ hours. The product had an intrinsic viscosity of 0.38 g./dl. and its molecular weight was 49,100.

EXAMPLE 5

The procedure of Example 3 was repeated, substituting N,N'-diphenyl-N,N'-dimethylethylenediamine on an equimolar basis for the N,N'-diphenylethylenediamine and using 0.448 ml. of the Cu$_2$O/HBr solution. The polymerization time was about 1½ hours. The product had an intrinsic viscosity of 0.43 g./dl. and its molecular weight was 50,200.

EXAMPLE 6

The procedure of Example 3 was repeated, replacing the N,N'-diphenylethylenediamine with N,N,N',N'-tetramethyl-o-phenylenediamine and using the catalyst ingredients in the copper:bromine:diamine:secondary amine:tertiary amine mole ratios of 1:5:2:9:40. After a polymerization time of 5 hours, the product had an intrinsic viscosity of 0.35 and a molecular weight of 43,000.

EXAMPLE 7

The procedure of Example 6 was repeated except that the copper:bromine:diamine mole ratio was 1:2:1, corresponding to the stoichiometry of the complex of Example 1. After a reaction time of 7 hours, the polymer product had an intrinsic viscosity of 0.31 and a molecular weight of 35,000.

What is claimed is:

1. In a process for preparing a polyphenylene oxide which comprises oxidatively coupling a monohydroxy aromatic compound in the presence of a copper-halide-amine catlayst wherein at least one amine is a diamine, the improvement wherein said diamine has the formula

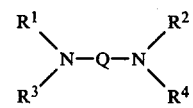

wherein Q is a lower hydrocarbon bridging radical in which the free valence bonds are attached to adjacent carbon atoms, each of $R^1$ and $R^2$ is a hydrocarbon or substituted hydrocarbon radical containing about 1–10 carbon atoms, wherein the substitutents do not materially alter the hydrocarbon character of the radical, and each of $R^3$ and $R^4$ is hydrogen or a saturated lower aliphatic radical, or $R^3$ and $R^4$ together form a divalent saturated aliphatic radical containing 2–4 carbon atoms; one of said radicals attached to each nitrogen atom being aromatic and the balance thereof being hydrogen, aliphatic or alicyclic.

2. A process according to claim 1 wherein the halide is bromide.

3. A process according to claim 2 wherein the amine component comprises at least one tertiary monoamine, at least one secondary monoamine and said diamine.

4. A process according to claim 3 wherein the source of copper and bromide ions is a solution of cuprous oxide in aqueous hydrogen bromide.

5. A process according to claim 4 wherein the molar ratio of bromide ions to copper ions is at least about 2:1, the molar ratio of tertiary monoamine to copper is about 10–100:1 and the molar ratio of diamine to copper is about 0.4–3:1.

6. A process according to claim 5 wherein the amount of secondary monoamine is about 0.5–3 mole percent based on monohydroxy aromatic compound.

7. A process according to claim 6 wherein the tertiary monoamine is dimethyl-n-butylamine and the secondary monoamine is di-n-butylamine.

8. A process according to claim 7 wherein the monohydroxy aromatic compound is 2,6-xylenol.

9. A process according to claim 8 wherein a phase transfer agent is also present in an amount of 0.1–0.8% by weight based on monohydroxy aromatic compound.

10. A process according to claim 9 wherein the amount of catalyst is such that the mole ratio of copper to 2,6-xylenol is from 1:100 to 1:1500.

11. A process according to claim 10 wherein Q is aliphatic or alicyclic and each of $R^1$ and $R^2$ is aromatic.

12. A process according to claim 11 wherein Q is the ethylene radical.

13. A process according to claim 12 wherein each of $R^1$ and $R^2$ is phenyl.

14. A process according to claim 13 wherein each of $R^3$ and $R^4$ is hydrogen.

15. A process according to claim 13 wherein each of $R^3$ and $R^4$ is methyl.

16. A process according to claim 13 wherein $R^3$ and $R^4$ together form an ethylene radical.

17. A process according to claim 10 wherein Q is aromatic and each of $R^1$ and $R^2$ is aliphatic or alicyclic.

18. A process according to claim 17 wherein Q is the o-phenylene radical.

19. A process according to claim 18 wherein each of $R^1$, $R^2$, $R^3$ and $R^4$ is methyl.

20. A process according to claim 1, 3, 5, 8, 9, 12, 14, 15, 16, 18 or 19 wherein the copper and at least a portion of the halide and diamine are provided in the form of a divalent copper complex having the formula

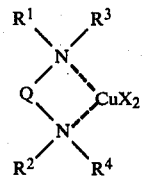

wherein X is halide.

21. A process according to claim 20 wherein X is bromide.

* * * * *